United States Patent
Kono (10) Patent No.: US 9,335,535 B2
(45) Date of Patent: May 10, 2016

(54) IMAGE ACQUISITION DEVICE (75) Inventor: Takayuki Kono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 400 days.

(21) Appl. No.: 13/484,943

(22) Filed: May 31, 2012

(65) Prior Publication Data

US 2013/0050463 A1    Feb. 28, 2013

(30) Foreign Application Priority Data

Aug. 31, 2011    (JP) .................................. 2011-189659

(51) Int. Cl.
| | |
|---|---|
| *H04N 7/18* | (2006.01) |
| *H04N 5/225* | (2006.01) |
| *G02B 21/34* | (2006.01) |
| *H01L 23/427* | (2006.01) |
| *G02B 21/36* | (2006.01) |
| *G02B 21/24* | (2006.01) |
| *G02B 21/16* | (2006.01) |

(52) U.S. Cl.
CPC ................ *G02B 21/36* (2013.01); *G02B 21/24* (2013.01); *G02B 21/16* (2013.01); *G02B 21/362* (2013.01)

(58) Field of Classification Search
CPC ......... H04N 7/18; H04N 5/225; H01L 23/427
USPC .............. 348/79, E07.085, 374; 358/93, 106; 165/86, 104.14
See application file for complete search history.

(56) References Cited

U.S. PATENT DOCUMENTS

| | | | | |
|---|---|---|---|---|
| 4,829,374 A | * | 5/1989 | Miyamoto et al. ............... | 348/79 |
| 5,332,031 A | * | 7/1994 | Kiga .................................. | 165/86 |
| 2003/0117523 A1 | * | 6/2003 | Hasegawa et al. ............. | 348/374 |
| 2008/0055718 A1 | * | 3/2008 | Kono et al. ..................... | 359/381 |

FOREIGN PATENT DOCUMENTS

| | | |
|---|---|---|
| JP | 2000102026 A | 4/2000 |
| JP | 2003230031 A | 8/2003 |
| JP | 2008300904 A | 12/2008 |
| JP | 4466394 | 5/2010 |

OTHER PUBLICATIONS

Machine translation of Japanese Patent Publication No. 2006-222546, dated Aug. 24, 2006 (first publication of JP 4466394).

* cited by examiner

*Primary Examiner* — Sath V Perungavoor
*Assistant Examiner* — Patricia I Young
(74) *Attorney, Agent, or Firm* — Scully, Scott, Murphy & Presser, P.C.

(57) ABSTRACT

Size reduction is achieved while also achieving both high sensitivity and high pixel density. Provided is an image acquisition device including an image acquisition element that acquires an image of a sample, a closed container that accommodates and seals the image acquisition element therein, a camera body that accommodates the closed container, and a displacement member that moves the image acquisition element relative to the camera body in a direction perpendicular to an optical axis of the image acquisition element. At least a portion of the displacement member is disposed outside the closed container.

12 Claims, 7 Drawing Sheets

IMAGE ACQUISITION DEVICE

BACKGROUND OF THE INVENTION

1. Field of the Invention

The present invention relates to image acquisition devices used in optical apparatuses, such as microscopes.

This application is based on Japanese Patent Application No. 2011-189659, the content of which is incorporated herein by reference.

2. Description of Related Art

In microscope observation, high-quality (high-resolution) images are required when performing pathological diagnosis based on the condition of cells or when acquiring images for detecting changes in a sample based on weak fluorescence. As means used for acquiring images, image acquisition devices employing image acquisition elements, such as CCDs, have been used in place of image acquisition devices employing conventional silver-salt films as image acquisition media (for example, see the U.S. patent application, Publication No. 2003/0117523 A1 and the Publication of Japanese Patent No. 4466394).

An image acquisition device disclosed in the U.S. patent application, Publication No. 2003/0117523 A1 includes a solid-state image acquisition element for acquiring an image of an object to be observed, cooling means for cooling the solid-state image acquisition element, and a printed board for electrical signal wiring. The printed board serves as a portion of sealing means for sealing the solid-state image acquisition element and the cooling means. A displacement member for moving the solid-state image acquisition element with a low pixel count over a two-dimensional plane extending perpendicularly to the optical axis is provided inside the sealing means.

With this configuration, the solid-state image acquisition element can be connected to an external unit outside a camera via the printed board serving as a portion of a closed container, thereby eliminating the need to use a sealing cable. Specifically, a board configuration that is not limited by the current-carrying capacity is achieved while also reducing dark-current noise and preventing condensation.

Furthermore, since the number of pixels in an acquired image is increased by moving the solid-state image acquisition element using the displacement member, the amount of observation light per pixel can be increased, thereby allowing for an increased number of pixels in an observation image without reducing the sensitivity.

An image acquisition device disclosed in the Publication of Japanese Patent No. 4466394 includes an outer housing that forms a first closed chamber sealed from outside air by an O-ring, an inner housing that forms a second closed chamber sealed from the first closed chamber, and an image acquisition element and a Peltier element disposed within the second closed chamber. Since the second closed chamber has a double-walled structure sealed from the outside air, the amount of moisture in the outside air entering the chamber can be reduced.

This configuration makes it difficult for the moisture contained in the outside air to enter the second closed chamber, thereby preventing performance degradation and reduced lifespan of the image acquisition element and the Peltier element.

In order to cope with design limitations and various applications, a camera attachment section of a microscope is disposed in various locations, such as the upper surface, the front surface, the bottom surface, or the side surfaces of the microscope. Because the installation space for a camera is limited, it is preferable that an image acquisition device including the camera be made as small as possible. Of various types of microscopes, stereomicroscopes are often incorporated in production lines. Therefore, it is desirable that the image acquisition device be as small as possible. Furthermore, in another proposed example of a microscope in the related art, functional components, such as the image acquisition device and an objective lens, are disposed within a single housing instead of being attached to the microscope afterwards. Due to these circumstances, there is an increasing demand for reducing the size of the image acquisition device.

On the other hand, there is an increasing demand for higher image quality and higher sensitivity in microscope observation for performing pathological diagnosis based on the condition of cells or for acquiring images for detecting changes in a sample based on weak fluorescence.

In the image acquisition device disclosed in the U.S. patent application, Publication No. 2003/0117523 A1, the displacement member, which requires a large space, is provided for achieving both high sensitivity and high pixel density. This displacement member is disposed within the closed container. The size of the image acquisition device is limited by the size of the closed container.

In the image acquisition device disclosed in the Publication of Japanese Patent No. 4466394, the first closed chamber is disposed outside the second closed chamber. The size of the image acquisition device is limited by the space in the closed container and the thickness of the components.

BRIEF SUMMARY OF THE INVENTION

The present invention provides an image acquisition device including an image acquisition element configured to acquire an image of an object, a closed container configured to accommodate and seal the image acquisition element therein, a housing configured to accommodate the closed container, and a displacement member configured to move the image acquisition element relative to the housing in a direction perpendicular to an optical axis of the image acquisition element. At least a portion of the displacement member is disposed outside the closed container.

DETAILED DESCRIPTION OF THE INVENTION

First Embodiment

An image acquisition device according to a first embodiment of the present invention will be described below with reference to FIGS. 1 to 4.

Figure 1:
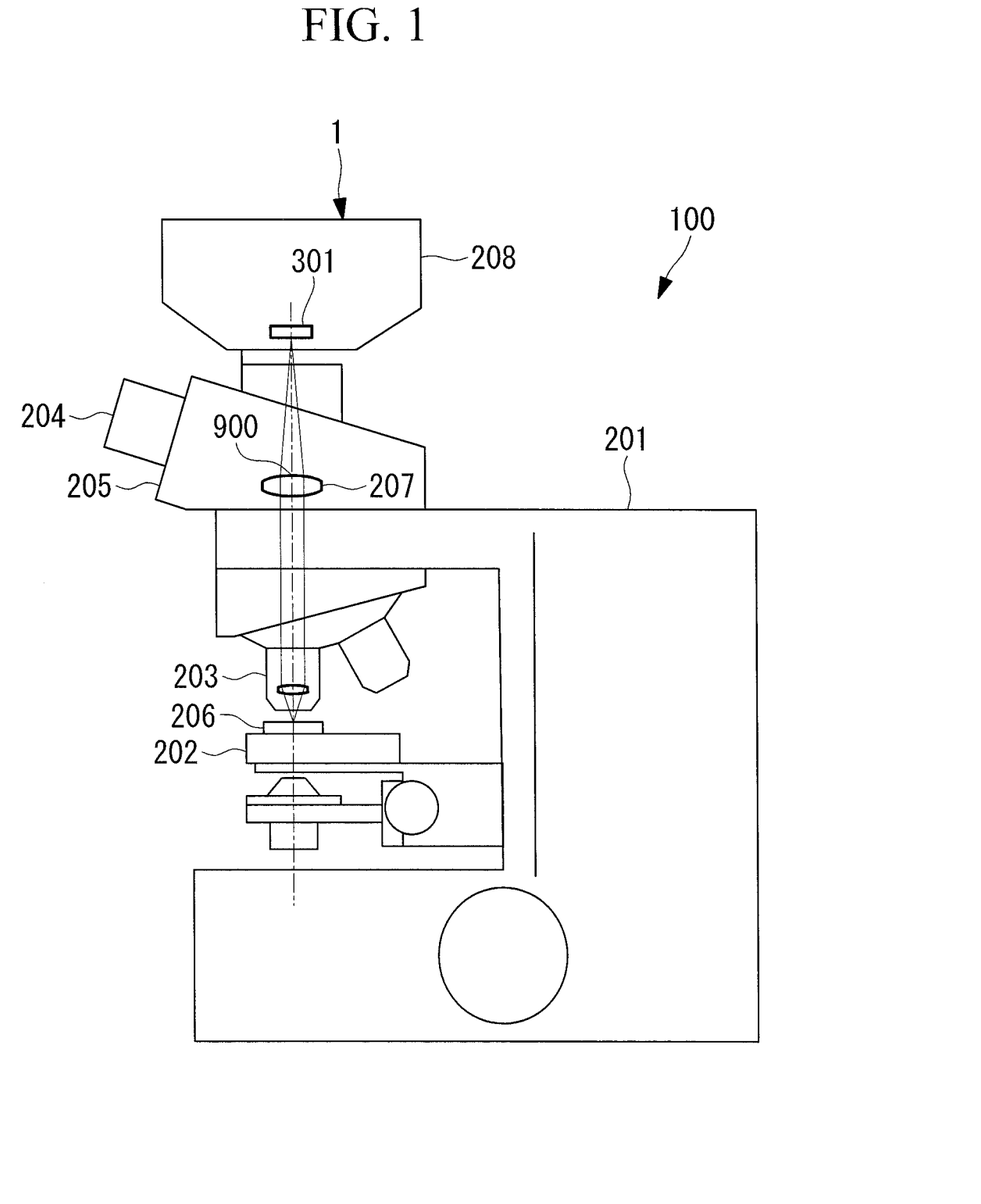
FIG. 1 schematically illustrates the configuration of a microscope equipped with a camera according to an embodiment of the present invention.

FIG. 1 schematically illustrates the configuration of a microscope 100 equipped with a camera (image acquisition device) 1 according to the first embodiment of the present invention.

The microscope 100 according to this embodiment includes a microscope body 201, a stage 202, an objective lens 203, an eyepiece 204, a lens barrel 205, an image forming lens 207, and the camera 1.

The objective lens 203 for magnifying a sample image is disposed facing the stage 202 and is provided in the microscope body 201. The stage 202 on which a sample (object) 206 is placed and which is vertically movable in the direction of an optical axis 900 of the objective lens 203 is provided on the microscope body 201. By vertically moving the stage 202, the sample 206 is positioned relative to the objective lens 203 in the direction parallel to the optical axis 900 of the objective lens 203.

Moreover, the microscope body 201 is provided with the image forming lens 207 that forms an image of the sample 206 on an image acquisition element 301 within the camera 1, and is also provided with the lens barrel 205 fitted with the eyepiece 204 used for visual observation. The camera 1 is provided at a stage behind the image forming lens 207 (in the direction parallel to the optical axis 900 of the objective lens 203).

Figure 2:
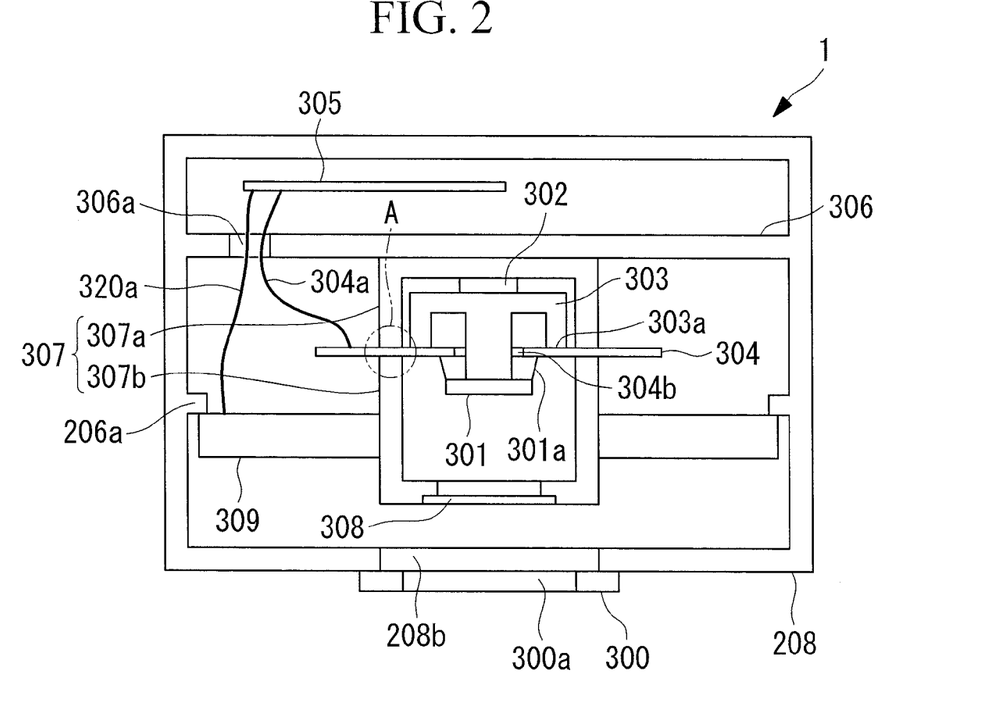
FIG. 2 is a vertical sectional view schematically showing the configuration of a camera according to a first embodiment of the present invention.
Figure 3:
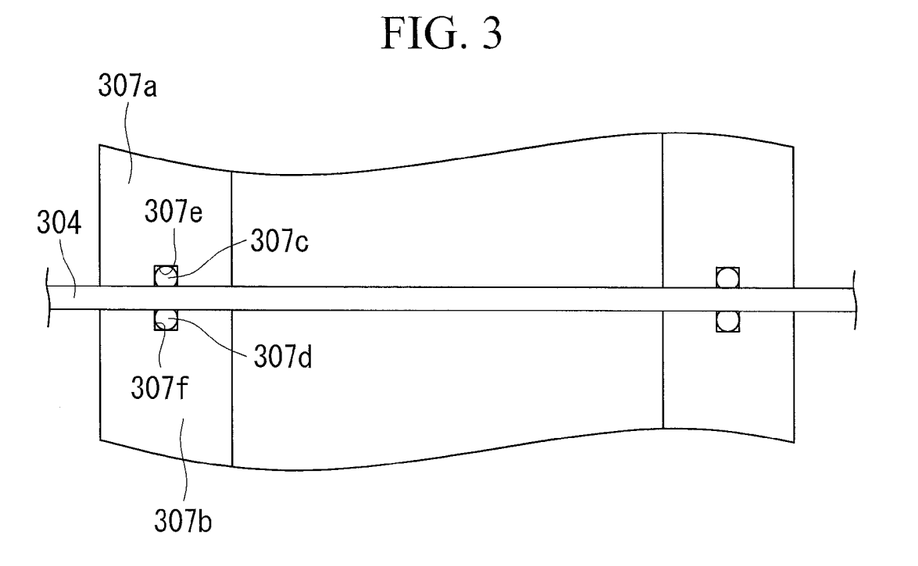
FIG. 3 is an enlarged view of area A in FIG. 2.

FIG. 2 illustrates the internal configuration of the camera 1 according to this embodiment. FIG. 3 is an enlarged view of area A in FIG. 2, showing the relationship between a closed container and a board, to be described later.

As shown in FIGS. 2 and 3, the camera 1 includes an image acquisition element 301 that acquires an image of the sample 206, a closed container 307 that accommodates and seals the image acquisition element 301 therein, a camera body (housing) 208 that accommodates the closed container 307, and a displacement member 309 provided around an outer side surface (in the horizontal direction in FIG. 2) of the closed container 307 within the camera body 208.

A connector 300 is fixed to the camera body 208 and connects the camera body 208 to the lens barrel 205. The connector 300 has an opening 300a through which observation light can enter. The camera body 208 also has an opening 208b for the same purpose.

Reference numeral 302 denotes a Peltier element (i.e., a cooling mechanism), and reference numeral 303 denotes a heat sink that thermally connects the image acquisition element 301 and the Peltier element 302. A board 304 has the image acquisition element 301 mounted thereto and activates the image acquisition element 301 in response to an electrical signal received from a driver board 305 via a cable 304a. A midsection of the board 304 is provided with an opening 304b in which the heat sink 303 is disposed. The Peltier element 302 and the board 304 are connected to each other via a cable (not shown). The image acquisition element 301 is equipped with a metal pin 301a for transmitting signals and also for fixing the image acquisition element 301 in position. The pin 301a is soldered to the board 304.

Thermally conductive grease (i.e., a heat transfer member) is filled between the heat sink 303 and the image acquisition element 301, between the heat sink 303 and the Peltier element 302, and between the Peltier element 302 and an upper component 307a, to be described later.

The heat sink 303 has a contact section 303a that is in contact with the board 304, and is fixed to the board 304 with a screw (not shown) by using a tap (not shown) provided at the contact section 303a. In order to prevent heat generated by the Peltier element 302 from being transferred to the image acquisition element 301, it is desirable that the contact section 303a and the board 304 be thermally insulated from each other by disposing a resin material therebetween.

The board 304 is fixed to the closed container 307 with a screw (not shown). The driver board 305 is fixed to the camera body 208 with a screw (not shown). Moreover, the driver board 305 is connected, via a cable (not shown), to a controller (not shown), such as a personal computer, disposed outside the camera 1.

As is apparent from FIG. 2, the image acquisition element 301 and the Peltier element 302 are disposed inside the closed container 307. A water-absorbing material (not shown), such as silica gel, is also disposed inside the closed container 307.

The closed container 307 is provided for protecting electronic components disposed therein, such as the image acquisition element 301 and the Peltier element 302, from external moisture. The closed container 307 is constituted of two components, which are an upper component 307a and a lower component 307b having the shape of a closed-end cylinder, that is, substantially cup-shaped. The board 304 is disposed between the upper component 307a and the lower component 307b. A glass member 308 is disposed at the lower side of the closed container 307 so as to allow for transmission of observation light from the microscope body 201. The glass member 308 is securely bonded to the lower component 307b without any gaps by using an adhesive (not shown).

As shown in FIG. 3, a contact surface between the upper component 307a and the board 304 is provided with a groove 307e extending along the entire circumference of the contact surface. An O-ring (elastic member) 307c is fitted in this groove 307e so as to extend along the entire circumference of the contact surface between the upper component 307a and the board 304, thereby reducing the amount of moisture entering the closed container 307.

Likewise, a contact surface between the lower component 307b and the board 304 is provided with a groove 307f extending along the entire circumference of the contact surface. An O-ring 307d is fitted in this groove 307f so as to extend along the entire circumference of the contact surface between the lower component 307b and the board 304, thereby reducing the amount of moisture entering the closed container 307. The O-rings 307c and 307d are compressed by an amount equivalent to about 30% of their size, which is enough for sealing the gaps without causing the O-rings 307c and 307d to break.

The displacement member 309 is disposed around a lower side surface of the closed container 307. A movable section, to be described later, of the displacement member 309 and the closed container 307 are fixed to each other with a screw (not shown). An inner side surface of the camera body 208 is provided with a fixation section 206a. The displacement member 309 and the camera body 208 are fixed to each other at the fixation section 206a by using a screw (not shown).

An intermediate plate 306 constituting a portion of the camera body 208 is disposed above the closed container 307 inside the camera body 208. Gaps between components, particularly, the gap between the upper surface of the upper component 307a constituting the closed container 307 and the lower surface of the intermediate plate 306, are filled with the thermally conductive grease. With this thermally conductive grease, heat can be transferred between the components without having to mechanically fix the components to each other. As is apparent from FIG. 2, the intermediate plate 306 is partially provided with an opening 306a. The cable 304a and a cable 320a, to be described later, extend through this opening 306a.

Figure 4:
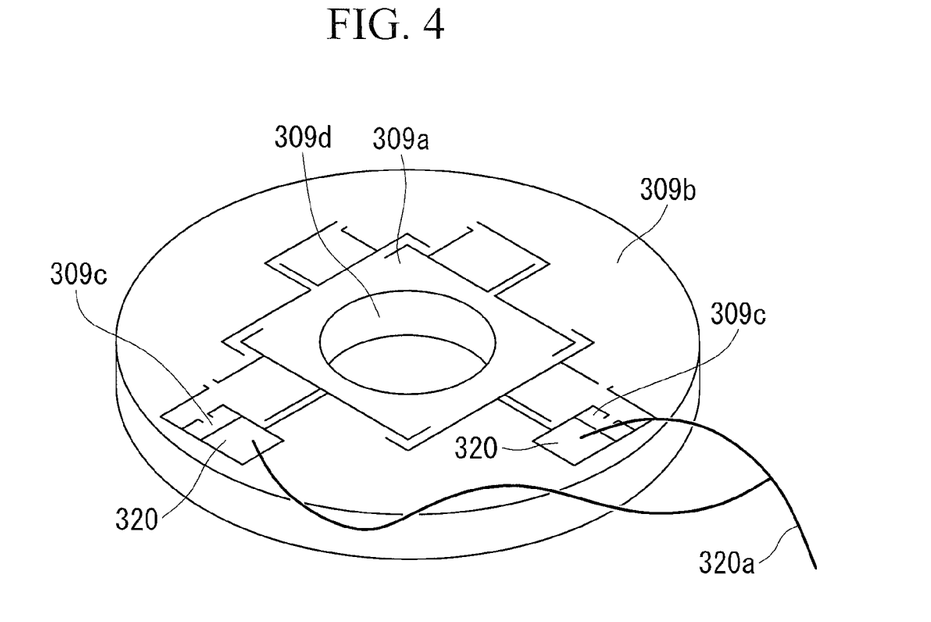
FIG. 4 is a perspective view showing the configuration of a displacement member in FIG. 2.

FIG. 4 illustrates the displacement member 309 in detail.

As shown in FIG. 4, the displacement member 309 has the shape of a disk with a hole in the center, and includes a movable section 309a fixed to the closed container 307, a fixed section 309b fixed to the camera body 208, and hinge sections 309c that connect the two sections 309a and 309b. The displacement member 309 is integrally formed and has grooves formed therein by, for example, a wire-cut machining method. Piezoelectric elements 320 for moving the movable section 309a relative to the fixed section 309b are bonded to two areas located perpendicularly to each other between the movable section 309a and the fixed section 309b.

The piezoelectric elements 320 are connected to the driver board 305 via the cable 320a. The fixed section 309b is fixed to the camera body 208 with a screw (not shown). An opening 309d is provided in the middle of the movable section 309a, and the closed container 307 is insertable into the opening 309d.

With the above configuration, the displacement member 309 can move the closed container 307 and the image acquisition element 301 accommodated within the closed container 307 relative to the camera body 208 in a direction perpendicular to the optical axis of the image acquisition element 301.

The operation of the microscope 100 having the above-described configuration will be described below.

When a sample image is to be acquired, the sample 206 is placed on the stage 202, and the stage 202 is moved in the vertical direction so as to align the sample 206 with the focal position of the objective lens 203. Thus, a magnified image of the sample 206 becomes observable via the image forming lens 207 and the eyepiece 204.

When observing with the image acquisition element 301, the observation light is made to enter the camera body 208 by operating an optical-path switching unit (not shown) disposed in the lens barrel 205.

Subsequently, the controller (not shown) is operated where necessary.

When an image with a low number of pixels is to be acquired by using the image acquisition element 301, an image of light entering the image acquisition element 301 is acquired without particularly moving the displacement member 309 via the controller.

On the other hand, when an image with a high number of pixels is to be acquired, the controller is first operated so as to acquire an image. Then, the controller is further operated so as to move the displacement member 309 by a distance equivalent to the pixel pitch so that the required number of pixels can be obtained.

In this case, based on a drive signal from the controller, a voltage is applied to the piezoelectric elements 320 via a cable (not shown), the driver board 305, and the cable 320a, thereby moving the movable section 309a. Consequently, since the movable section 309a and the closed container 307 are fixed to each other with the screw (not shown), the closed container 307, the image acquisition element 301 disposed inside the closed container 307, the Peltier element 302, the heat sink 303, and the board 304 are moved relative to the camera body 208.

Because a force generated by the piezoelectric elements 320 is sufficiently larger than the weight of the closed container 307 and the components disposed therein, the closed container 307 can be reliably moved to a position desired by an observer. Since the cables 304a and 320a are sufficiently longer than the distance between their opposite connected ends, the cables are not stretched when the movable section 309a is moved, thereby preventing the cables from hindering the movement of the movable section 309a. Furthermore, since the gap between the upper component 307a constituting the closed container 307 and the intermediate plate 306 is filled with thermally conductive grease, as described above, so that it is possible to transfer heat therebetween without having to mechanically fix the components to each other, the upper component 307a and the intermediate plate 306 are also prevented from hindering the movement of the movable section 309a.

Furthermore, the image acquisition element 301 is connected to a cooling surface of the Peltier element 302 via the heat sink 303. Consequently, when the Peltier element 302 is activated in response to an electrical signal from the driver board 305, the image acquisition element 301 can be efficiently cooled so that dark-current noise, which may cause problems during an image acquisition process, can be reduced. In addition, the gap between the upper component 307a and a heat-dissipating surface opposite the cooling surface of the Peltier element 302 is filled with thermally conductive grease, as described above. Consequently, the heat from the Peltier element 302 is transferred to the camera body 208 via the upper component 307a and the intermediate plate 306, and the camera body 208 is subsequently air-cooled (i.e., dissipates the heat).

Accordingly, with the camera 1 according to this embodiment, the image acquisition element 301 is moved relative to the camera body 208 in the direction perpendicular to the optical axis of the image acquisition element 301 by moving the displacement member 309, so that the number of pixels in an image acquired by the image acquisition element 301 can be increased. Thus, the amount of observation light per pixel in the image acquisition element 301 can be increased, thereby allowing for an increased number of pixels in the acquired image without reducing the sensitivity.

In this case, in the camera 1 according to this embodiment, the displacement member 309 is entirely disposed outside the closed container 307. Therefore, the size of the closed container 307 and the camera body 208 that accommodates the closed container 307 can be reduced, as compared with a case where the displacement member 309 is accommodated inside the closed container 307, thereby reducing the size of the device. Moreover, with the reduced size of the closed container 307, the amount of water-absorbing material for preventing condensation in the closed container 307 can be reduced. In addition, since the sizes of the components constituting the closed container 307 can be reduced, a significant cost reduction can be achieved.

Because the driving unit for the displacement member 309 is disposed outside the closed container 307, if this driving unit fails, the need for repairing the driving unit in a low humidity environment can be eliminated. This allows for a simple repair process for the user, thereby significantly reducing the downtime of the device.

Furthermore, since the displacement member 309 is disposed around the outer side surface (i.e., the outer side in the direction perpendicular to the optical axis of the image acquisition element) of the closed container 307, the device can be reduced in size in the optical-axis direction by an amount equivalent to the thickness of the displacement member 309.

Furthermore, with the displacement member 309 biasing the closed container 307 in the direction perpendicular to the optical axis of the image acquisition element 301, the structure of the closed container 307 can be simplified, thereby improving the sealing properties thereof so as to prevent condensation therein.

Although the image acquisition element 301 is fixed to the board 304 via a pin in this embodiment, the present invention is not necessarily limited to this configuration. Similar advantages can be achieved by fixing the image acquisition element 301 to the closed container 307 or the heat sink 303 and using a cable or the like only for electrically connecting the image acquisition element 301 to the board 304.

Furthermore, although the above description of this embodiment relates to an example in which the displacement member 309 is moved by the observer, the present invention is not limited to this configuration. For example, similar advantages can be achieved by providing a program for moving the displacement member 309 in advance in accordance with the number of pixels, and allowing the user to execute the program.

Moreover, similar effects and advantages can be achieved by using an ultrasonic motor or a compact stepping motor as the driving unit in place of the piezoelectric elements 320.

Second Embodiment

Next, a camera 2 according to a second embodiment of the present invention will be described below with reference to FIG. 5. With regard to the camera 2 according to this embodiment, components that are the same as those in the camera 1 according to the first embodiment are given the same reference numerals, and descriptions thereof will be omitted. The following description mainly relates to the differences from the first embodiment.

Figure 5:
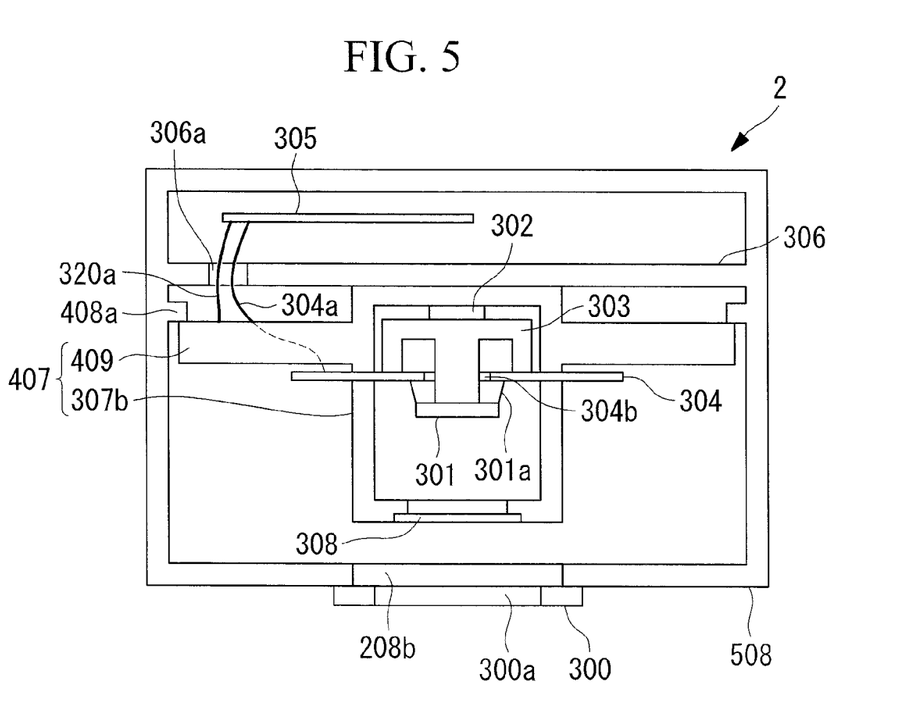
FIG. 5 is a vertical sectional view schematically showing the configuration of a camera according to a second embodiment of the present invention.

As is apparent from FIG. 5, in the camera 2 according to this embodiment, an inner wall of a movable section of a displacement member 409 serves as a portion of a closed container 407. A sealing member, such as an O-ring, is disposed in a contact surface between the displacement member 409 and the board 304 so as to eliminate any gaps therebetween, thereby reducing the amount of moisture entering the closed container 407.

The displacement member 409, the board 304, and the lower component 307b are fixed to each other with a screw (not shown).

The displacement member 409 is fixed to a protrusion 408a of a camera body 508 by using a screw (not shown).

The operation of the camera 2 according to this embodiment having the above-described configuration will be described below. Because the image acquisition procedure is the same as that in the above embodiment, the description thereof will be omitted here.

The image acquisition element 301 is connected to the cooling surface of the Peltier element 302 via the heat sink 303. Consequently, when the Peltier element 302 is activated in response to an electrical signal from the driver board 305, the image acquisition element 301 can be efficiently cooled so that dark-current noise, which may cause problems during the image acquisition process, can be reduced.

In addition, a gap between the displacement member 409 and the heat-dissipating surface opposite the cooling surface of the Peltier element 302 is filled with thermally conductive grease (not shown). Consequently, the heat from the Peltier element 302 is transferred to the camera body 508 via the displacement member 409 and the intermediate plate 306, and the camera body 508 is subsequently air-cooled (i.e., dissipates the heat).

With the camera 2 according to this embodiment, in addition to achieving advantages similar to those of the first embodiment described above, the closed container 407 and the displacement member 409 are formed as a single unit so that the movement of the displacement member 409 can be readily transmitted to the closed container 407 (and to the image acquisition element 301 disposed therein), whereby the image acquisition element 301 can be accurately moved relative to the camera body 508 in the direction perpendicular to the optical axis of the image acquisition element 301. Consequently, the image quality of an image acquired by the image acquisition element 301 can be improved. With the displacement member 409 and the closed container 407 formed as a single unit, the device can be formed at lower cost.

Third Embodiment

Next, a camera 3 according to a third embodiment of the present invention will be described below with reference to FIG. 6. With regard to the camera 3 according to this embodiment, components that are the same as those in the camera 1 according to the first embodiment are given the same reference numerals, and descriptions thereof will be omitted. The following description mainly relates to the differences from the first embodiment.

Figure 6:
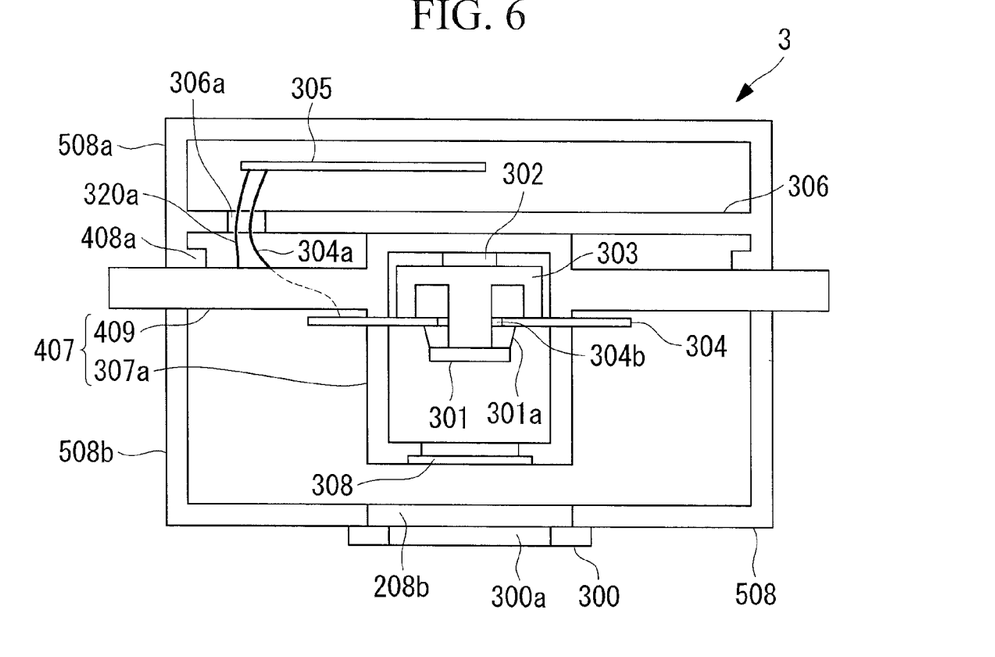
FIG. 6 is a vertical sectional view schematically showing the configuration of a camera according to a third embodiment of the present invention.

As shown in FIG. 6, in the camera 3 according to this embodiment, a camera body 508 is constituted of an upper component 508a and a lower component 508b having the shape of a closed-end cylinder, that is, substantially cup-shaped. A protrusion 408a of the upper component 508a and the displacement member 409 are fixed to each other with a screw (not shown), and the lower component 508b and a displacement member 409 are also fixed to each other with a screw (not shown). In the camera body 508 in FIG. 6, the horizontal dimensions of the upper component 508a and the lower component 508b are smaller than those of the displacement member 409. Specifically, the displacement member 409 is formed integrally with an upper side surface of a closed container 407 and protrudes outward from the side surface of the camera body 508. The upper component 508a is provided with the intermediate plate 306 and the opening 306a through which the cables 304a and 320a extend.

The operation of the camera 3 according to this embodiment having the above-described configuration will be described below. Because the image acquisition procedure is the same as that in the above embodiments, the description thereof will be omitted here.

The image acquisition element 301 is connected to the cooling surface of the Peltier element 302 via the heat sink 303. Consequently, when the Peltier element 302 is activated in response to an electrical signal from the driver board 305, the image acquisition element 301 can be efficiently cooled so that dark-current noise, which may cause problems during the image acquisition process, can be reduced.

In addition, a gap between the displacement member 409 and the heat-dissipating surface opposite the cooling surface of the Peltier element 302 is filled with thermally conductive grease (not shown). Consequently, the heat from the Peltier element 302 is transferred to the camera body 508 via the displacement member 409 and the intermediate plate 306, and the camera body 508 is subsequently air-cooled (i.e., dissipates the heat).

With the camera 3 according to this embodiment, in addition to achieving advantages similar to those of the first embodiment described above, the displacement member 409 is partially provided outside the camera body 508 so that the outline of the camera 3 can be made smaller. Moreover, since the displacement member 409 constituting the closed container 407 protrudes outward from the camera body 508, the heat generated by the image acquisition element 301 can be dissipated outward from the displacement member 409 via the closed container 407, thereby allowing for increased cooling efficiency for the image acquisition element 301.

Fourth Embodiment

Next, a camera 4 according to a fourth embodiment of the present invention will be described below with reference to FIGS. 7 and 8. With regard to the camera 4 according to this embodiment, components that are the same as those in the camera 1 according to the first embodiment are given the same reference numerals, and descriptions thereof will be omitted. The following description mainly relates to the differences from the first embodiment.

Figure 7:
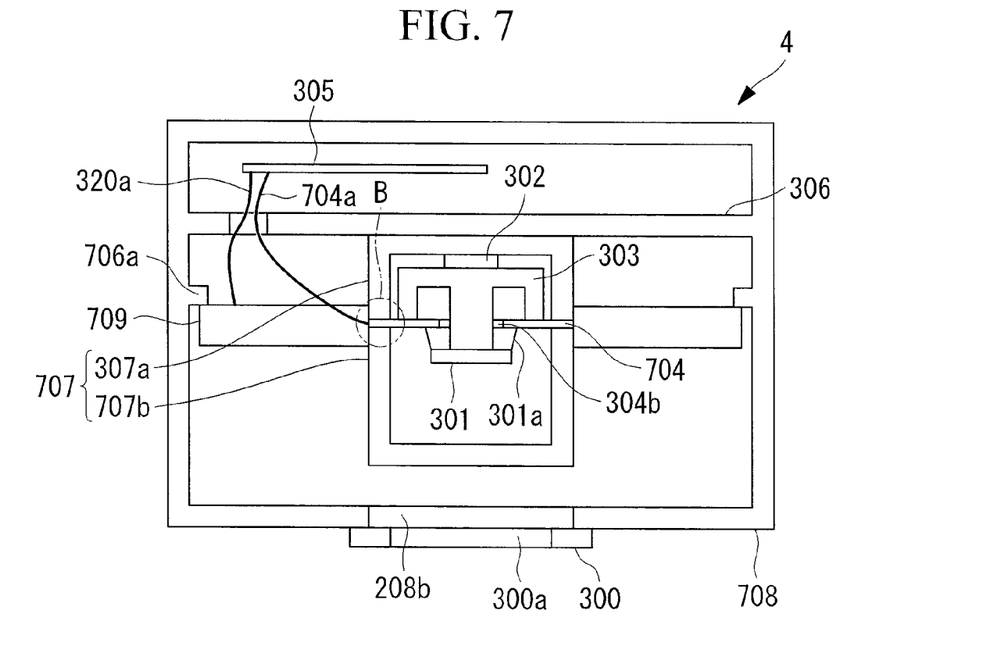
FIG. 7 is a vertical sectional view schematically showing the configuration of a camera according to a fourth embodiment of the present invention.

FIG. 7 is an overall view of the camera 4 according to this embodiment. FIG. 8 is an enlarged view of area B in FIG. 7, showing the relationships among a closed container 707, a board 704, and a displacement member 709.

As shown in FIG. 7, in the camera 4 according to this embodiment, the displacement member 709 is disposed at a position where an upper component 307a and a lower component 707b constituting the closed container 707 sandwich the board 704 in the optical-axis direction. The displacement member 709 is fixed to a protrusion 706a of a camera body 708 by using a screw (not shown). The horizontal dimensions of the board 704 are the same as those of the upper component 307a and the lower component 707b, or several tens of micrometers smaller. The lower component 707b is composed of a transparent material so as to be capable of transmitting observation light.

Figure 8:
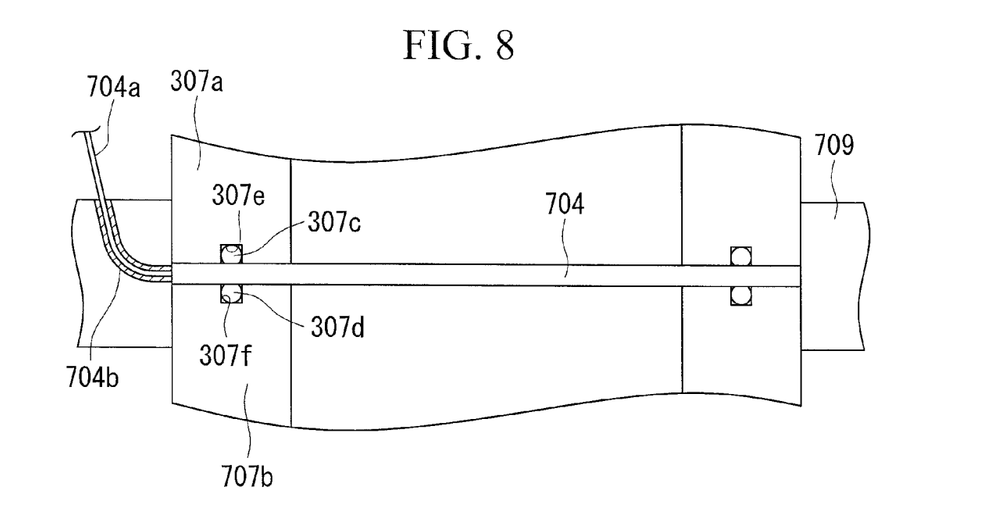
FIG. 8 is an enlarged view of area B in FIG. 7.

As shown in FIG. 8, the closed container 707 (i.e., the lower component 707b) is fixed to the displacement member 709 without any gaps by using an adhesive (not shown), thereby reducing the amount of moisture entering the closed container 707. O-rings 307c and 307d are compressed by an amount equivalent to about 30% of their size, which is enough for sealing gaps without causing the O-rings 307c and 307d to break.

A cable 704a extends through a cable-routing hole 704b provided in the displacement member 709 and is connected to the board 704. In the state where the cable 704a extends through the cable-routing hole 704b, the cable-routing hole 704b is sealed from the outside by a resin material, such as silicone.

The operation of the camera 4 according to this embodiment having the above-described configuration will be described below. Because the image acquisition procedure and the heat dissipation effect are the same as those in the above embodiments, the description thereof will be omitted here.

As described above, the closed container 707 is kept in a sealed state by the upper component 307a, the board 704, and the lower component 707b, and is further sealed by the displacement member 709. Furthermore, because the observation light is made to enter the closed container 707 via the lower component 707b composed of a transparent material, the closed container 707 does not have any gaps. This can significantly reduce the amount of moisture entering from the outside.

With the camera 4 according to this embodiment, in addition to achieving advantages similar to those of the first embodiment described above, the amount of moisture entering from the outside can be significantly reduced, whereby the electrical components inside the closed container 707 can be prevented from being damaged or failing due to moisture. Furthermore, in FIG. 7, since the displacement member 709 and the image acquisition element 301 are positioned close to each other in the vertical direction, Abbe errors can be reduced, whereby the displacement member 709 can be moved with higher accuracy. Consequently, the image acquisition element 301 can be accurately moved in the direction perpendicular to the optical axis, thereby improving the image quality of the image acquired by the image acquisition element 301.

Fifth Embodiment

Next, a camera 5 according to a fifth embodiment of the present invention will be described below with reference to FIGS. 9 and 10. With regard to the camera 5 according to this embodiment, components that are the same as those in the camera 1 according to the first embodiment are given the same reference numerals, and descriptions thereof will be omitted. The following description mainly relates to the differences from the first embodiment.

Figure 9:
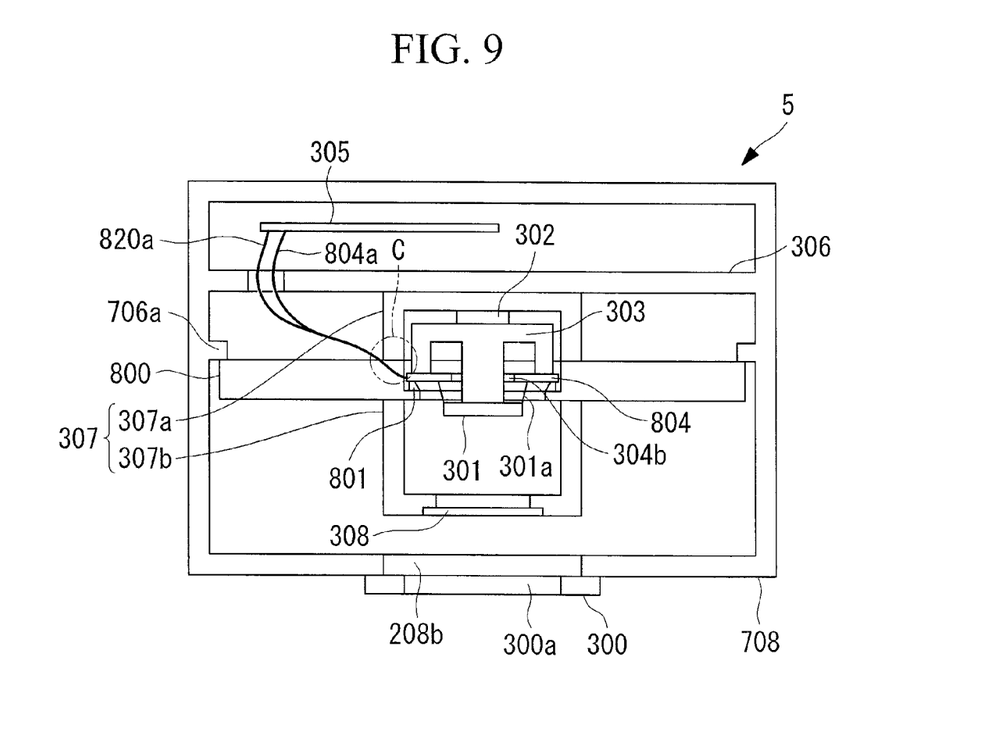
FIG. 9 is a vertical sectional view schematically showing the configuration of a camera according to a fifth embodiment of the present invention.

FIG. 9 is an overall view of the camera 5 according to this embodiment. FIG. 10 is an enlarged view of area C in FIG. 9, showing the relationships among the closed container 307, a board 804, and a displacement member 800.

Figure 10:
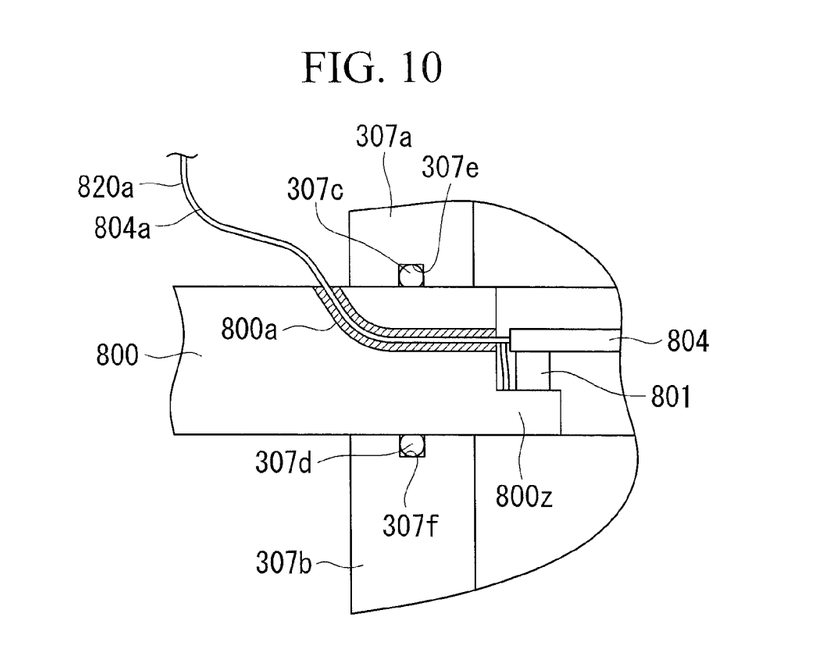
FIG. 10 is an enlarged view of area C in FIG. 9.

As shown in FIG. 10, in the camera 5 according to this embodiment, a cable 804a extends through a cable-routing hole 800a provided in the displacement member 800 and is connected to the board 804. A cable 820a also extends through the cable-routing hole 800a provided in the displacement member 800 and is connected to the piezoelectric elements 320. In the state where the cables 804a and 820a extend through the cable-routing hole 800a, the cable-routing hole 800a is sealed from the outside by a resin material, such as silicone.

A protrusion 800Z protrudes inward from the center of the displacement member 800. The protrusion 800Z is fixed to the board 804 via a stud 801. Hinge sections of the displacement member 800 are disposed outside the closed container 307. The displacement member 800 is partially disposed outside the closed container 307 and is fixed to a protrusion 706a of a camera body 708 with a screw (not shown).

The operation of the camera 5 according to this embodiment having the above-described configuration will be described below. Because the image acquisition procedure to be performed when acquiring an image with a low number of pixels is the same as that in the above embodiment, the description thereof will be omitted here.

When an image with a high number of pixels is to be acquired, the controller is first operated so as to acquire an image. Then, the controller is further operated so as to move the displacement member 800 by a distance equivalent to the pixel pitch so that the required number of pixels can be obtained. A drive signal from the controller is applied to the piezoelectric elements 320 via a cable (not shown), the driver board 305, and the cable 820a, thereby moving the movable section including the protrusion 800Z.

Since the protrusion 800Z and the board 804 are fixed to each other via the stud 801, the image acquisition element 301 and the heat sink 303 disposed inside the closed container 307 move in the direction perpendicular to the optical axis of the image acquisition element 301. Because a force generated by the piezoelectric elements 320 is sufficiently larger than the weight of the components disposed inside the closed container 307, the image acquisition element 301 can be reliably moved to a position desired by the observer.

Since the cables 804a and 820a have sufficient lengths within the closed container 307, the cables are not stretched when the movable section is moved, thereby preventing the cables from hindering the movement of the movable section. Because the gap between the upper component 307a and the intermediate plate 306 is filled with thermally conductive grease so that it is possible to transfer heat therebetween without having to mechanically fix the components to each other, the upper component 307a and the intermediate plate 306 are also prevented from hindering the movement of the movable section.

Furthermore, the image acquisition element 301 is connected to the cooling surface of the Peltier element 302 via the heat sink 303. Consequently, when the Peltier element 302 is activated in response to an electrical signal from the driver board 305, the image acquisition element 301 can be efficiently cooled so that dark-current noise, which may cause problems during the image acquisition process, can be reduced.

In addition, the gap between the upper component 307a and the heat-dissipating surface opposite the cooling surface of the Peltier element 302 is filled with thermally conductive grease (not shown). Consequently, the heat from the Peltier element 302 is transferred to the camera body 708 via the upper component 307a and the intermediate plate 306, and the camera body 708 is subsequently air-cooled (i.e., dissipates the heat).

Furthermore, as shown in FIG. 9, the closed container 307 is sealed from the outside by the upper component 307a, the displacement member 800, and the lower component 307b, thereby reducing the amount of moisture entering from the outside.

With the camera 5 according this embodiment, in addition to achieving advantages similar to those of the first embodiment described above, the board 804 having the image acquisition element 301 mounted thereto can be moved directly by the displacement member 800. Consequently, the image acquisition element 301 can be accurately moved in the direction perpendicular to the optical axis, thereby improving the image quality of the image acquired by the image acquisition element 301.

Sixth Embodiment

Next, a camera 6 according to a sixth embodiment of the present invention will be described below with reference to FIGS. 11 and 12. With regard to the camera 6 according to this embodiment, components that are the same as those in the camera 1 according to the first embodiment are given the same reference numerals, and descriptions thereof will be omitted. The following description mainly relates to the differences from the first embodiment.

Figure 11:
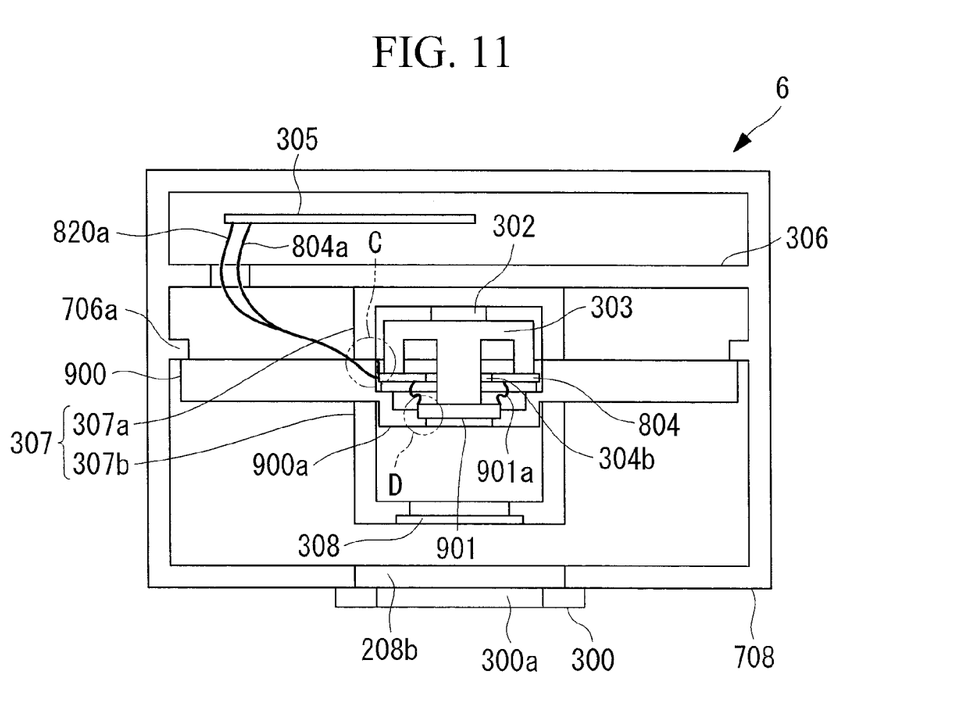
FIG. 11 is a vertical sectional view schematically showing the configuration of a camera according to a sixth embodiment of the present invention.

FIG. 11 is an overall view of the camera 6 according to this embodiment. FIG. 12 is an enlarged view of area D in FIG. 11, showing the relationship between an image acquisition element 901 and a displacement member 900.

Figure 12:
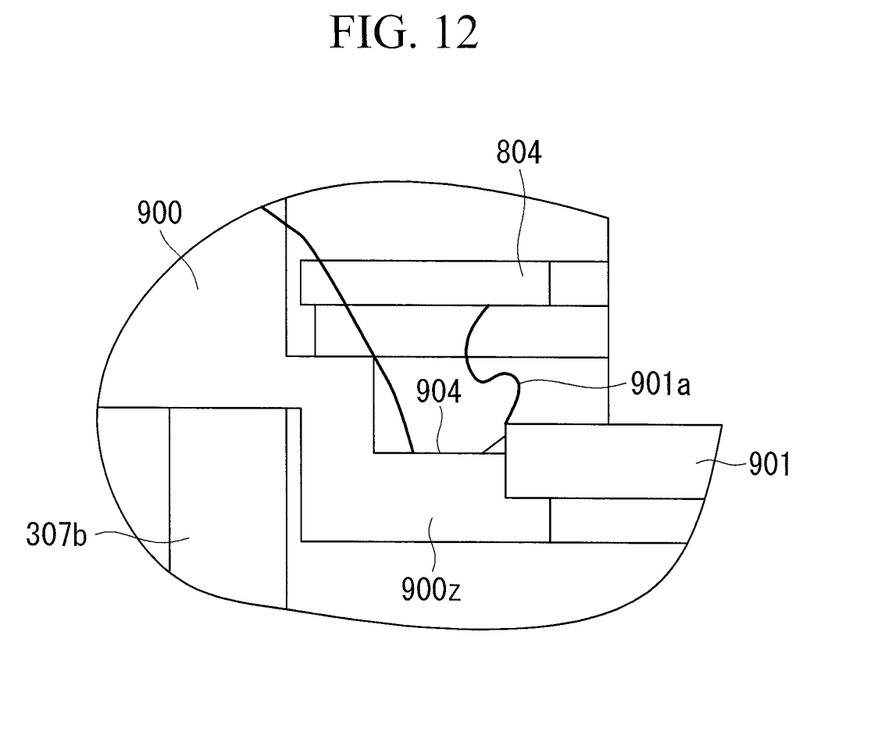
FIG. 12 is an enlarged view of area D in FIG. 11.

As shown in FIG. 12, in the camera 6 according to this embodiment, a central area 900a (see FIG. 11) of the displacement member 900 is provided with a protrusion 900z having a stepped shape for securing the image acquisition element 901 thereto, so that the image acquisition element 901 is insertable from above in FIG. 11. An upper surface 904 of the central area 900a of the displacement member 900 is disposed lower than the upper surface of the image acquisition element 901, and the image acquisition element 901 and the displacement member 900 can be fixed to each other with an adhesive. The displacement member 900 is partially disposed outside the closed container 307 and is fixed to the protrusion 706a of the camera body 708 by using a screw (not shown).

The image acquisition element 901 is connected to cables 901a used as supports and for signal transmission. The cables 901a are connected to a board 804. The cables 901a are secured in a bent state so that they are prevented from being disconnected when the central area 900a of the displacement member 900 moves.

The operation of the camera 6 according to this embodiment having the above-described configuration will be described below. Because the image acquisition procedure to be performed when acquiring an image with a low number of pixels is the same as that in the above embodiment, the description thereof will be omitted here.

When an image with a high number of pixels is to be acquired, the controller is first operated so as to acquire an image. Then, the controller is further operated so as to move the displacement member 900 by a distance equivalent to the pixel pitch so that the required number of pixels can be obtained. A drive signal from the controller is applied to the piezoelectric elements 320 via a cable (not shown), the driver board 305, and cable 820a, thereby moving the movable section including the protrusion 900z.

Since the protrusion 900z and the image acquisition element 901 are fixed to each other with an adhesive, the image acquisition element 901 moves. Because a force generated by the piezoelectric elements 320 is sufficiently larger than the weight of the image acquisition element 901, the image acquisition element 901 can be reliably moved to a position desired by the observer. In this case, since the cables 901a are in a bent state, they are prevented from being disconnected when the image acquisition element 901 moves.

The image acquisition element 901 is connected to the cooling surface of the Peltier element 302 via the heat sink 303. Consequently, when the Peltier element 302 is activated in response to an electrical signal from the driver board 305, the image acquisition element 901 can be efficiently cooled so that dark-current noise, which may cause problems during the image acquisition process, can be reduced.

With regard to the heat sink 303, the board 804, and the Peltier element 302 disposed above the image acquisition element 901, thermally conductive grease (not shown) is filled between these components. Therefore, the heat sink 303, the board 804, and the Peltier element 302 are not mechanically fixed to the image acquisition element 901, but are maintained in position by the viscosity of the grease.

With the camera 6 according to this embodiment, in addition to achieving advantages similar to those of the first embodiment described above, since the image acquisition element 901 itself can be directly moved by the displacement member 900, the image acquisition element 901 can be accurately moved in the direction perpendicular to the optical axis, thereby improving the image quality of the image acquired by the image acquisition element 901.

Although the embodiments of the present invention have been described above in detail with reference to the drawings, specific configurations are not to be limited to these embodiments, and various design modifications are to be included so long as they do not depart from the spirit of the invention. For example, the present invention may be applied to an embodiment constituted of an appropriate combination of the above embodiments.

What is claimed is:

1. An image acquisition device comprising:
an image sensor configured to acquire an image of an object;
a closed container configured to accommodate and seal the image sensor in an interior of the closed container;
a housing, the closed container being disposed within the housing; and
a displacement member, the displacement member having an opening, the closed container being held in the opening in a direction of an optical axis of the image sensor, the displacement member being configured to move the closed container and the image sensor accommodated in the closed container relative to the housing in a direction perpendicular to the optical axis of the image sensor,
wherein the displacement member having portions extending from the opening which holds the closed container.

2. The image acquisition device according to claim 1, further comprising a cooling mechanism provided within the closed container and configured to cool the image sensor.

3. The image acquisition device according to claim 1, further comprising a heat transfer member disposed between the closed container and the housing.

4. The image acquisition device according to claim 1, wherein the displacement member includes
a fixed section that is fixed to the housing,
a piezoelectric element that is connected to the fixed section and moves in the direction perpendicular to the optical axis of the image sensor when a voltage is applied to the piezoelectric element, and
a movable section that is connected to the image sensor and is movable by the piezoelectric element.

5. The image acquisition device according to claim 1, wherein the displacement member biases the closed container in the direction perpendicular to the optical axis of the image sensor.

6. The image acquisition device according to claim 5, wherein the displacement member and the closed container are formed as a single unit.

7. The image acquisition device according to claim 1, wherein the displacement member is partially disposed outside the housing.

8. The image acquisition device according to claim 1, further comprising a board on which the image sensor is mounted, and
wherein the displacement member is in contact with the board.

9. The image acquisition device according to claim 1, further comprising a board on which the image sensor is mounted, and
wherein the displacement member is connected to the board.

10. The image acquisition device according to claim 1, wherein the displacement member is in contact with the image sensor.

11. The image acquisition device according to claim 3, wherein the heat transfer member is a thermally conductive grease.

12. A closed container for use with an image acquisition device, the closed container comprising:
a body defining a sealed interior;
an image sensor disposed in the sealed interior and configured to acquire an image of an object; and
a displacement member connected to the body and configured to move the closed container and the image sensor disposed in the closed container relative to a housing in a direction perpendicular to an optical axis of the image sensor, the displacement member including an opening, the closed container being held in the opening in a direction of the optical axis of the image sensor;
wherein the displacement member having portions extending from the opening which holds the closed container.

* * * * *